(No Model.) 2 Sheets—Sheet 2.

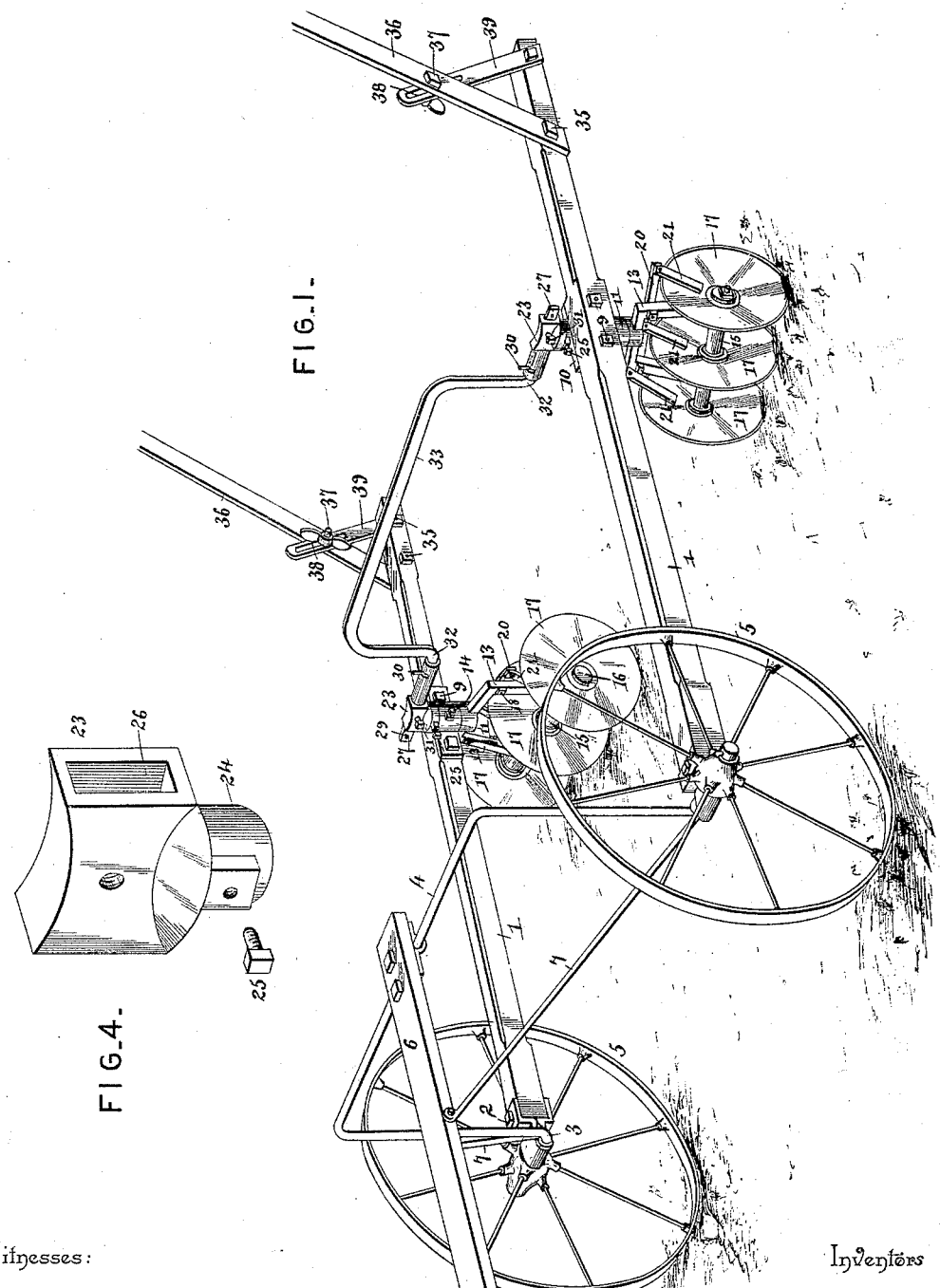

J. W. DENNEY & T. M. HILSABECK.
CULTIVATOR.

No. 467,400. Patented Jan. 19, 1892.

Witnesses
Jas. K. McCathran
D. P. Nothaupter

Inventors
J. W. Denney
T. M. Hilsabeck
By their Attorneys,
C. A. Snow & Co.

UNITED STATES PATENT OFFICE.

JOSEPH W. DENNEY AND THARA M. HILSABECK, OF MANNING, IOWA.

CULTIVATOR.

SPECIFICATION forming part of Letters Patent No. 467,400, dated January 19, 1892.

Application filed September 19, 1891. Serial No. 406,212. (No model.)

*To all whom it may concern:*

Be it known that we, JOSEPH W. DENNEY and THARA M. HILSABECK, citizens of the United States, residing at Manning, in the county of Carroll and State of Iowa, have invented a new and useful Corn-Cultivator, of which the following is a specification.

This invention relates to improvements in cultivators; and the objects in view are to provide a cultivator employing cultivating-disks so arranged as to discharge the soil to or from the corn or other vegetable cultivated; to so form the disks as to especially adapt them to tear up the soil, thoroughly sift or pulverize said soil, and cast the weeds removed upon the surface of the ground, whereby their roots being exposed they soon die; to provide means for scraping the disks and adjusting said scrapers; to provide means for permitting of the raising and lowering of the gangs of disks independent of each other without influencing the companion disks, and, furthermore, to permit of lateral vibrations of the beams without altering the adjustment of the disks with relation to each other and the line of draft.

With the above objects in view the invention consists in certain features of construction hereinafter specified, and particularly pointed out in the claims.

Figure 3:
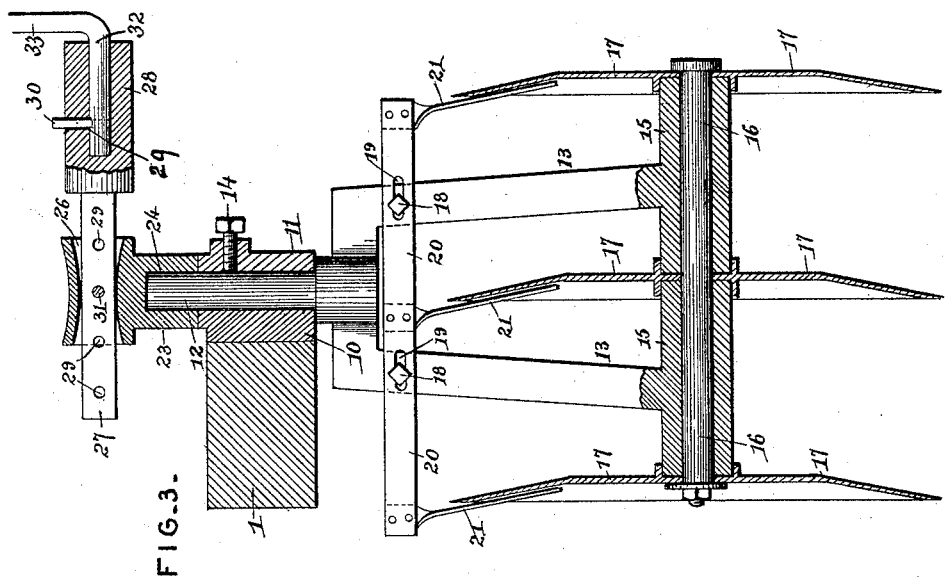
Figure 2:
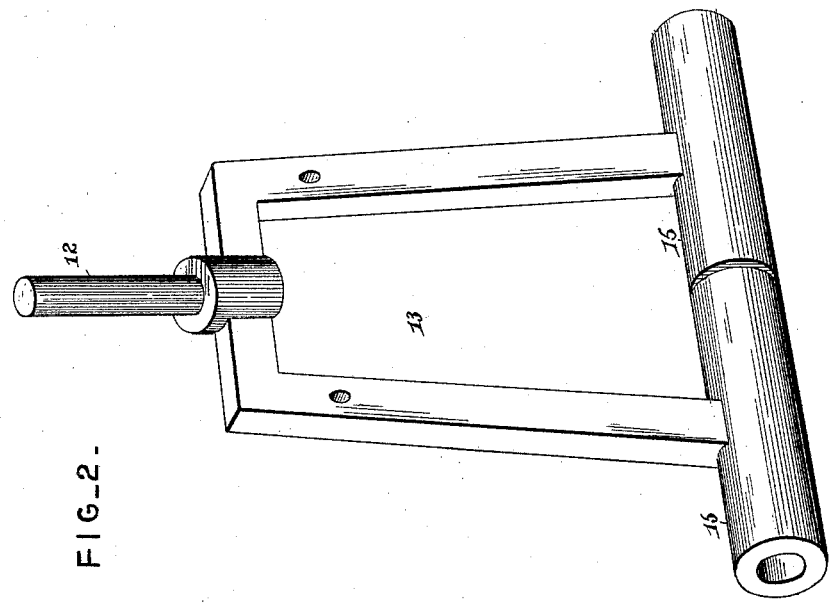

Referring to the drawings, Figure 1 is a perspective of a cultivator-frame provided with cultivating-disks in accordance with our invention. Fig. 2 is a detail in enlarged perspective of one of the disk-axle-supporting stirrups. Fig. 3 is a transverse section through the harrow-beam and stirrup. Fig. 4 is a detail in perspective of the casting employed for connecting the adjustable disk-gangs with the intermediate arch.

Like numerals of reference indicate like parts in all the figures of the drawings.

1 designates a pair of ordinary cultivator-beams, the front halves of which are preferably formed heavier than are their rear halves, whereby they are the better adapted to withstand the strain to which those portions of the beams lying in front of the cultivator-gangs, hereinafter described, are subjected. The front ends of the beams are by a pair of knuckles 2 loosely connected to the cranked bearing ends 3 of an arched axle 4. Beyond the knuckles the axle has mounted thereon ground-wheels 5, and to its center is connected a draft-beam 6, braced by suitable hounds 7 to the axle.

To the inner sides of the beams 1, near their middles, there is bolted to each, as at 9, a plate 10, having a vertical bearing-eye 11. This bearing-eye receives in a swiveled manner the reduced shank 12, formed at the upper end of an inverted-U-shaped stirrup 13, said shank extending above the opening or eye and being adapted to be locked in any of its swiveled positions through the medium of a binding-screw 14, passed through the eye and bearing on the shank 12. The lower ends or terminals of the stirrups are each provided with transverse bearings 15, and in that of each stirrup is mounted an axle 16, to which, between the bearings and the outside of the same, making a series of three, is secured cultivating-disks 17. The disks are bound together by means of a nut mounted on the end of the axle and rotate with the axle, which latter, as before stated, is journaled in the bearings 15. The disks are of concavo-convex form, are flat at their centers, and from a circle drawn midway between their perimeters and centers are inclined or disposed at an angle to their flat central portions. Disks thus constructed are better adapted to penetrate the ground, pulverize the soil, and tear up the same and the roots of any weeds with which they come in contact. Bolts 18 pass through slots 19, formed in a transverse adjusting-bar 20, one of which is secured to each of the stirrups upon the front face thereof. From the bars depend scrapers 21, one for each disk, and said scrapers are simply metal blades bolted or riveted to the bars and below their shanks given a quarter-twist, so as to bring their flat faces toward the inner sides or concave faces of the disks. These blades in cross-section are curved or concave upon their inner sides, so that when adjusted against the face of a disk they are adapted to scrape the same when moving in either direction. A casting 23, having a cylindrical socket 24 in its under side, is fitted upon the upper end of each of the shanks of the stirrups and may be adjusted thereon by means of a binding-bolt 25, passed through the casting and terminating upon said shank. The upper end of the casting is provided with a transverse opening or slot 26, flared, as shown, toward its ends, and the same loosely receives one end of a bar 27. The bar and the casting are perforated, so that the former is adjustable in the latter and may be locked at any point by a bolt 31, passed through the perforation in the walls of the slot 26 and through the bar. The outer end of the bar terminates in a bored cylindrical socket 28, which is provided upon its upper side with a short transverse slot 29.

33 designates an arch, the ends of which are laterally bent, as at 32, and adapted to enter the cylindrical sockets. These arms 32 are provided with pins 30, which project upwardly through the short slots of the sockets and thus limit the rotary movement of the arms of the arch in said sockets. To the rear ends of the beams there are pivoted by bolts 35 handles 36, which extend rearwardly and above the ends of the beams, and are provided above said beams with adjusting-bolts 37, which pass through the upper slotted ends 38 of a pair of braces 39, pivoted at their lower ends to the extremities of the beams 1. By means of these adjustable braces it will be seen that the handles may be raised and lowered as may be desired and convenient to the operator.

From the foregoing description, taken in connection with the accompanying drawings, it will be seen that the gangs of disk-cultivators may be turned at any angle to the beams, so as to throw the dirt either toward or away from the corn or other plants being cultivated and may be locked in such position, which angle they will maintain regardless of the rise and fall of the beams independent of each other or the advancement or retreat of one beam beyond that of the other.

Having described our invention, what we claim is—

1. In a harrow of the class described, the combination, with the opposite beams having bearings and the inverted-U-shaped stirrups provided at their upper ends with shanks pivotally mounted in the bearings and at their lower ends terminating in bearings, of means for adjusting the shanks in the bearings, transverse axles mounted in the bearings of the stirrups, disks mounted on said axles, bolts passed through the stirrups, slotted transverse bars mounted on the bolts above the disks, nuts for clamping the same in their adjusted positions, and scraping-blades depending from the transverse bars, substantially as specified.

2. In a harrow of the class described, the combination, with the opposite beams, the axle to which the beams are hinged for vertical movement, and the stirrups swiveled in the beams and carrying the disks, of a transverse bar loosely connected at its ends to the upper ends of the stirrups and permitting independent movement thereof, substantially as specified.

3. In a harrow of the class described, the combination, with the front axle, the opposite beams hinged for vertical movement to the same, and the stirrups swiveled in the beams and carrying the disks, of a transverse bar loosely and adjustably connected at its ends to the upper ends of the stirrups and permitting independent movement thereof, substantially as specified.

4. In a harrow of the class described, the combination, with the opposite beams, the inverted-U-shaped stirrup-carrying disks, said stirrups being provided at their upper ends with shanks swiveled in the beams, and the castings mounted on the upper ends of the shanks and adjustable thereon by set-screws and provided with transverse openings and a perforation, of bored arms having reduced perforated outer ends pivotally and adjustably mounted in the transverse openings of the castings, and the transverse arched bar terminating in outwardly-disposed ends loosely mounted in the bores of the arms and provided with pins extending through short slots formed in the bored arms, substantially as specified.

5. The arch 33, having its ends laterally bent and provided with pins 30, the sockets 28, having the slots 29 and fitted on the ends of the arch, and the bars 27, on which the sockets are formed, combined with the casting 23, having a socket 24 and provided with a transverse opening, and the stirrup carrying the disks and mounted in the socket 24, substantially as described.

In testimony that we claim the foregoing as our own we have hereto affixed our signatures in presence of two witnesses.

JOSEPH W. DENNEY.
THARA M. HILSABECK.

Witnesses:
F. W. AMEY,
JOS. WILSON.